United States Patent Office 2,908,542
Patented Oct. 13, 1959

2,908,542

WOOD TREATING PROCESS

Eduard Farber, Washington, D.C., assignor to Timber Engineering Company, Washington, D.C., a corporation of Delaware No Drawing. Application May 14, 1957
Serial No. 658,949

6 Claims. (Cl. 8—6.5)

This invention relates to the preparation of cedarwood for the manufacture of pencils. More particularly, the invention relates to a novel process effective to impart a reddish color to the heart and sapwood of incense cedar.

It is conventional practice in the prior art to treat cedarwood from which pencils are manufactured to impart thereto a generally uniform reddish color by impregnation of cedar slats with a solution of an appropriate dye, normally an azo-dyestuff. More specifically, in accordance with such prior art processes, cedar slats are moved through pressure vessels containing a dyestuff solution. Vacuum and superatmospheric pressure conditions are required to effect saturation or impregnation of the cedarwood slats with the dyestuff solution. During the period of residence in the pressure vessels, normally at least about a few hours, the cedarwood slats increase in weight about 150% to 200% by reason primarily of water absorption. Water so absorbed must be removed over a long period of time in a carefully regulated, drying operation which normally requires from about ten to about fourteen days, and necessitates the maintenance of a large inventory of pencil slats in process.

It is accordingly a primary object of the invention to provide an improved method for imparting a satisfactory red internal coloration to cedarwood pencil slats.

It is a more specific object of the invention to provide a method for the production of a satisfactory internal red color in cedarwood slats which does not require the utilization of vacuum or superatmospheric pressure conditions.

It is an additional object of the invention to provide a process for imparting a satisfactory color to cedar pencil slats pursuant to which treated slats can be effectively dried without material adverse effect in a substantially shorter time period than is required by prior art methods.

It is yet a further object of the invention to provide an economical method for imparting a satisfactory red color to cedarwood pencil slats which can be completed in materially less time than conventional processes for achieving a like result.

It is a further specific object of the invention to provide a method for imparting to the interior of cedarwood a reddish coloration appropriate for the manufacture of pencils by contacting cedarwood with an alkoxy amine.

More particularly, in accordance with this invention it has been discovered that a reddish coloration satisfactory for pencil manufacture can be imparted to cedarwood by contacting said cedarwood with an aliphatic hydroxy amine having the formula:

I 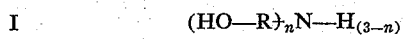

wherein $n$ is an integer from 1 to 3 and R is any alkylene group containing from 1 to 4 carbon atoms, to effect absorption by said cedarwood of from about 1% to about 6% by weight of said amine.

In accordance with the invention, all hydroxy amines responding to Formula I can be employed. Monoethanolamine, diethanolamine, triethanolamine, and mixtures thereof, are preferred. Additional specific amines contemplated by the invention include monomethanolamine, dimethanolamine, trimethanolamine, monopropanolamine, dipropanolamine, tripropanolamine, monobutanolamine, dibutanolamine, tributanolamine, amines in which the alkylene radicals in Formula I are different, such as monoethanol, monopropanolamine; monomethanol, diethanolamine; and the like.

Particularly appropriate are mixtures of the hydroxy amines contemplated by the invention, such as mixtures of monoethanolamine and triethanolamine, monoethanolamine and dipropanolamine, diethanolamine and monoethanolamine, and the like. The invention is embracive of the utilization of such mixtures in all proportions. A preferred embodiment takes the form of a mixture containing from about 2 to about 10 parts by weight of monoethanolamine, and from about 0.5 to about 2 parts by weight of triethanolamine.

Pursuant to the invention, cedarwood is contacted with a hydroxy amine in aqueous solution, or in vapor form, or in any other desired manner. The utilization of alkoxy amines in aqueous solution is preferred in the process of the invention.

When aqueous amine treating solutions are utilized in the practice of the invention, the concentration of hydroxy amine therein and the conditions of treatment can vary over relatively wide limits. In general, the invention contemplates utilization of aqueous solutions containing from about 2% to about 25% by weight of the selected hydroxy amine or mixture of alkoxy amines. It will be appreciated that when aqueous solutions containing hydroxy amines in relatively low concentrations, for example, between about 2% to about 6% by weight, are employed, relatively longer times or relatively higher temperatures, or a combination thereof, may be required to produce the desired satisfactory reddish coloration.

More specifically, a treatment period of from about 10 minutes to about 4 hours at a temperature of from about 50° C. to about 90° C. is appropriate when utilizing aqueous solutions containing from about 2% to about 6% by weight of hydroxy amine. Similarly, an adequate treatment may be effected by dipping the cedarwood into aqueous solutions of comparatively high concentration, for example, solutions containing from about 15% to about 25% by weight of hydroxy amine, for a period of from about one to about five minutes at temperatures not in excess of about 30° C.

Any and all appropriate means and expedients can be employed for effecting the requisite contact between the cedarwood and the aqueous amine treating solution. For example, cedarwood pencil slats may be appropriately immersed in, sprayed or doused with, or otherwise brought into effective contact with the treating solution employed.

To facilitate and expedite the absorption of the amine treating solution by the cedarwood, it is appropriate and preferable to vary the treating temperature during the contact period. Accordingly, pursuant to a preferred embodiment of the invention, cedarwood is initially contacted with a treating solution at a relatively high temperature in excess of about 50° C., and preferably from about 60° C. to the boiling point of the solution under atmospheric conditions, for a relatively short period of not more than 60 minutes, preferably from about 15 to about 30 minutes, and thereafter with a treating solution of lower temperature for a time period requisite to complete absorption by the cedarwood of the necessary quantity of amine. A particularly appropriate application of the invention entails immersing for a period of not more than about 60 minutes, preferably from about 15 to about 30 minutes, cedarwood slats in an aqueous amine treating solution initially maintained at a temperature in excess of about 50° C. for a period of not more than 60 minutes, and thereafter cooling the treating solution in which the cedarwood remains immersed to a substantially lower temperature to complete the absorption by the wood of the necessary amount of amine. Regardless of the temperature variation expedient adopted, it is preferred that the final or second stage treating solution be at least about 10° C. cooler than the initial or first stage treating solution.

In the alternative procedure contemplated by the invention which entails dousing or spraying the cedarwood with an appropriate aqueous amine treating solution, there is preferably employed from about 50 to about 100 parts by weight of treating solution containing from about 4% to about 20% by weight of hydroxy amine for each 100 parts by weight of air dry wood.

In the practice of that embodiment of the invention in which the hydroxy amine treating agent is employed in vapor form, the cedarwood slats may be positioned, suspended, or otherwise arranged in known manner in a closed chamber in which the selected alkoxy amine is vaporized.

Treatment of cedarwood slats in accordance with this invention, particularly when the treatment entails the utilization of an aqueous solution of the selected amine, imparts a certain degree of softness to the treated wood. This softness can be enhanced by the incorporation of appropriate softening agents into the amine treating solution. Appropriate softening agents include urea, paraffin emulsions, polyethylene glycols, invert sugar, and the like. Generally, there is appropriately employed from about 2% to about 5% by weight of such softening agents in the aqueous amine treating solutions of the invention. More specifically, about 1% to about 3% by weight, preferably about 2% by weight, of polyethylene glycol having an average molecular weight of about 200, from about 3% to about 6% by weight, preferably about 4% by weight, of invert sugar, or from about 1% to about 6% by weight, preferably about 4% by weight, of urea, is appropriate for utilization in the treating solutions of the invention.

The process of the invention is particularly effective to impart a reddish coloration appropriate for pencil manufacture to the interior of the cedarwood treated. However, the surface of the treated wood may reflect an inadequate or unsatisfactory coloration. In the event that an intensified surface coloration is desired, the amine treated cedarwood may be brought into contact, for a short period of time, with a dilute water solution of a dyestuff to impart the desired surface coloration thereto.

In the preferred practice of the invention in which an aqueous amine treating solution is employed, water is removed from the treated slats and the slats are dried over a relatively long period of time to facilitate uniform distribution of the amine in the wood while the wood is wet, and to minimize accumulation of the amine near the wood surface. In general, it is preferred to remove the water in a two-stage operation. In the initial stage, the slats are covered with a suitable material, such as a cloth, and maintained in a drying chamber at a temperature of from about 60° C. to about 100° C. for at least about 5 hours, preferably about 8 to about 12 hours. In the second and final stage, the slats are uncovered and are exposed to a stream of drying air at a temperature of from about 60° C. to about 100° C. to produce a colored cedarwood product which contains not more than about 10% by weight, preferably from about 5% to about 10% by weight, of water.

It will be appreciated that better results are obtained when water is removed from the treated cedarwood over a period of time of at least about twelve hours.

*Example I*

An aqueous amine treating solution is prepared by adding 600 grams of monoethanolamine and 600 grams of saccharose to 19 liters of water, heating the resulting solution to about 70° C., and thereafter dissolving in the heated solution about 100 grams of stearic acid.

A bundle of 100 cedarwood pencil slats, measuring approximately 2⅝ x ¼ x 7¼ inches and weighing 2620 grams is immersed in the treating solution maintained at a temperature of about 70° C. throughout a two hour treating period. At the termination of the two hour treating period, the slats are removed from the treating solution, drained for a short period of time, and found to weight 3,589 grams, representing a weight increase of 37%. The moist slats were then lightly covered with a tarpaulin and positioned in a heating and drying chamber where the temperature is maintained at 70° C. for about 18 hours. At the end of this time, the cover is removed and the slats are dried in an air stream at a temperature of about 70° C. for two days to approximately the initial weight. The interior of the treated slots is a uniform reddish color appropriate for pencil manufacture. The slats are sufficiently soft to be easily cut by a knife. The exterior surface of the slats is not sufficiently colored for pencil manufacture, and is either removed or colored with an appropriate dye stuff prior to utilization.

*Example II*

A bundle of slats of the same type as described in Example I is immersed for about 15 minutes in a solution containing 5% by weight of monoethanolamine and 1% by weight of oleic acid maintained at a temperature of 85° C. Upon removal from the treating solution, it is found that the slats had increased in weight by 32%. The moisture content of the treated slats is reduced and the slats dried in the same manner as described in Example I. The dried slats so produced are satisfactorily colored internally for the manufacture of pencils. The exterior surface coloration is similar to that reported in Example I.

In a modification of this example, the slats are transferred from the first or initial treating solution and immersed for about five minutes in a second treating solution containing 2% by weight of monoethanolamine and 0.1% by weight of the aniline dyestuff "Cedar Brown" maintained at a temperature of 30° C. After the removal of water and drying in the manner described in Example I, the slats so treated are satisfactorily colored both internally and externally.

*Example III*

A bundle of slats of the same type as described in Example I are immersed for three minutes in an aqueous solution containing about 20% by weight of monoethanolamine and about 4% by weight of urea maintained at a temperature of about 25° C. The slats, upon removal from the treating solution, reflected a weight increase of about 30% and are reduced in moisture content and dried in the same manner as described in Example I to produce a treated slat product showing a reddish internal wood coloration appropriate for pencil manufacture.

*Example IV*

A bundle of slats of the same type as described in Example I is immersed for about 25 minutes in a first aqueous treating solution containing about 2% by weight of monoethanolamine and about 1% by weight of triethanolamine, maintained at a temperature of about 80° C., and thereafter immediately immersed in a second treating solution maintained at a temperature of 30° C., similar to the first but containing, as an additional material, 0.1% by weight of cedar brown dyestuff. After 15 minutes immersion in the second treating solution, the slats reflect a weight increase of 50%. Subsequent to water removal and drying in the manner described in Example I, the treated slats show an internal and external reddish coloration satisfactory for pencil manufacture.

Example V

A bundle of slats of the same type as described in Example I is immersed for about 15 minutes in a first aqueous solution containing about 2% by weight of monoethanolamine and about 2% by weight of monohydroxyethyl-trihydroxypropyl-ethylene-diamine, and maintained at a temperature of 70° C. The slats, upon removal from the first treating solution, reflect a weight increase of about 30%. The treatment was completed by immersing the slats immediately after removal from the first treating solution, for a period of about ten minutes, in a second treating solution, maintained at a temperature of 25° C., of the same type as the first but containing in addition 0.15% by weight of a brown aniline dyestuff. The slats upon removal from the second treating solution reflect a weight increase of about 54%. Upon removal of the water and drying in the manner described in Example I, the slats are characterized, internally and externally, by a reddish coloration appropriate for pencil manufacture.

I claim:

1. A process for imparting a reddish coloration, satisfactory for pencil manufacture, to cedarwood by contacting said cedarwood with an aliphatic hydroxy amine having the formula $(HO-R)_n N-H_{(3-n)}$ wherein $n$ is an integer from 1 to 3 and R is any alkylene group containing from 1 to 4 carbon atoms, to effect absorption by said cedarwood of from about 1% to about 6% by weight of said amine.

2. A process for imparting a reddish coloration, satisfactory for pencil manufacture, to cedarwood which comprises contacting said cedarwood with an aqueous solution containing from about 2% to about 25% by weight of an aliphatic hydroxy amine having the formula $(HO-R)_n N-H_{(3-n)}$ wherein $n$ is an integer from 1 to 3 and R is any alkylene group having from 1 to 4 carbon atoms under conditions to effect absorption by said wood of from about 1% to about 6% by weight of said amine, and thereafter removing water from the treated cedarwood product.

3. The process of claim 2 wherein said amine is selected from the group consisting of monoethanolamine, diethanolamine, triethanolamine, and mixtures thereof.

4. The process of claim 2 wherein said aqueous solution contains from about 2% to about 6% by weight of said amine.

5. The process of claim 2 wherein said water is gradually removed from the treated cedarwood over a time period of at least about 12 hours to produce a colored cedarwood product containing not more than about 10% by weight of water.

6. The process of claim 2 wherein said aqueous solution contains a softening agent selected from the group consisting of urea, paraffin emulsions, polyethylene glycols, and invert sugar.

References Cited in the file of this patent
UNITED STATES PATENTS

| | | |
|---|---|---|
| 2,302,760 | Goodman | Nov. 24, 1942 |
| 2,320,426 | Goodman | June 1, 1943 |